INVENTOR.
ANDREW F. KRITSCHER
BY Donald G. Dalton
HIS ATTORNEY

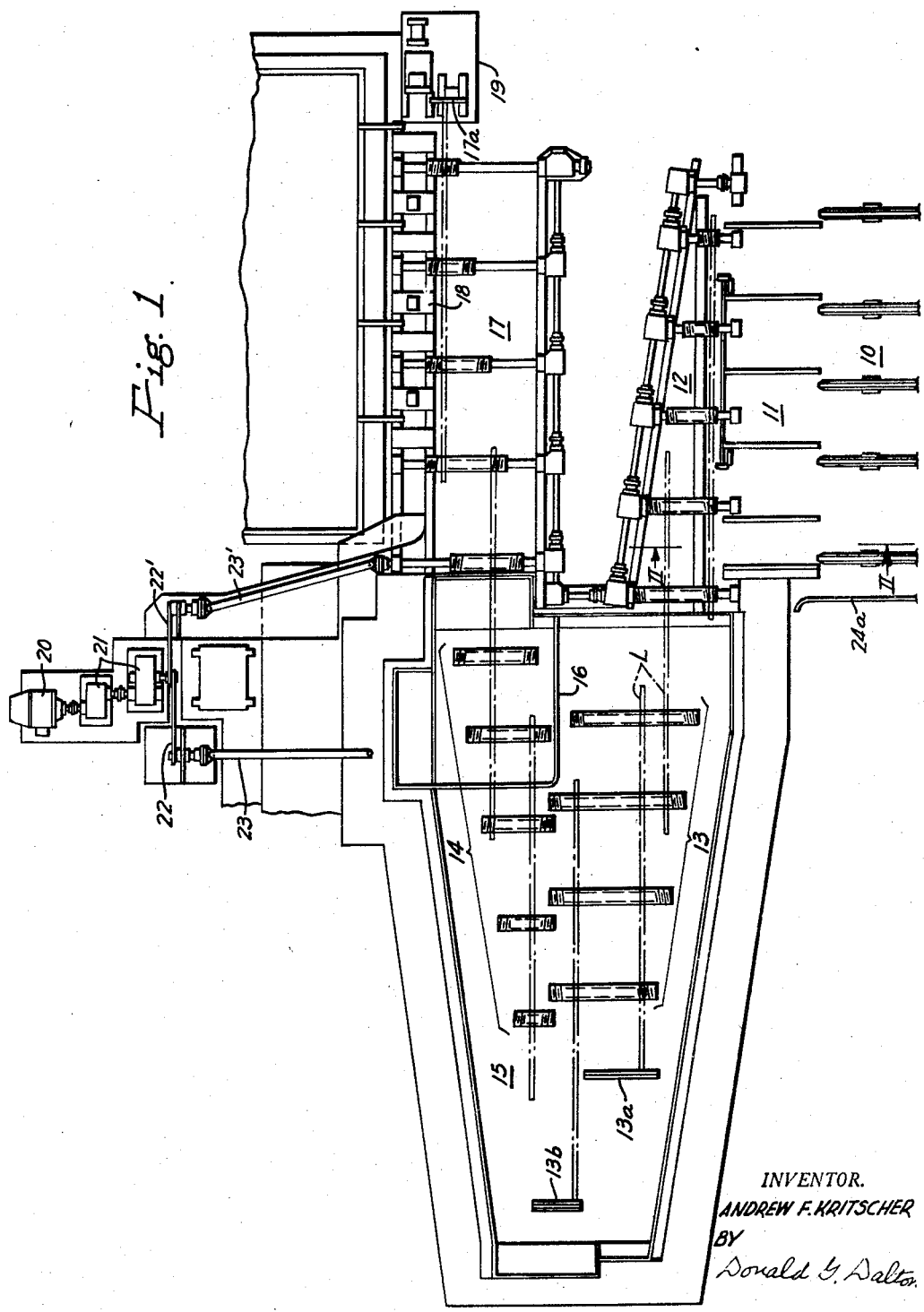

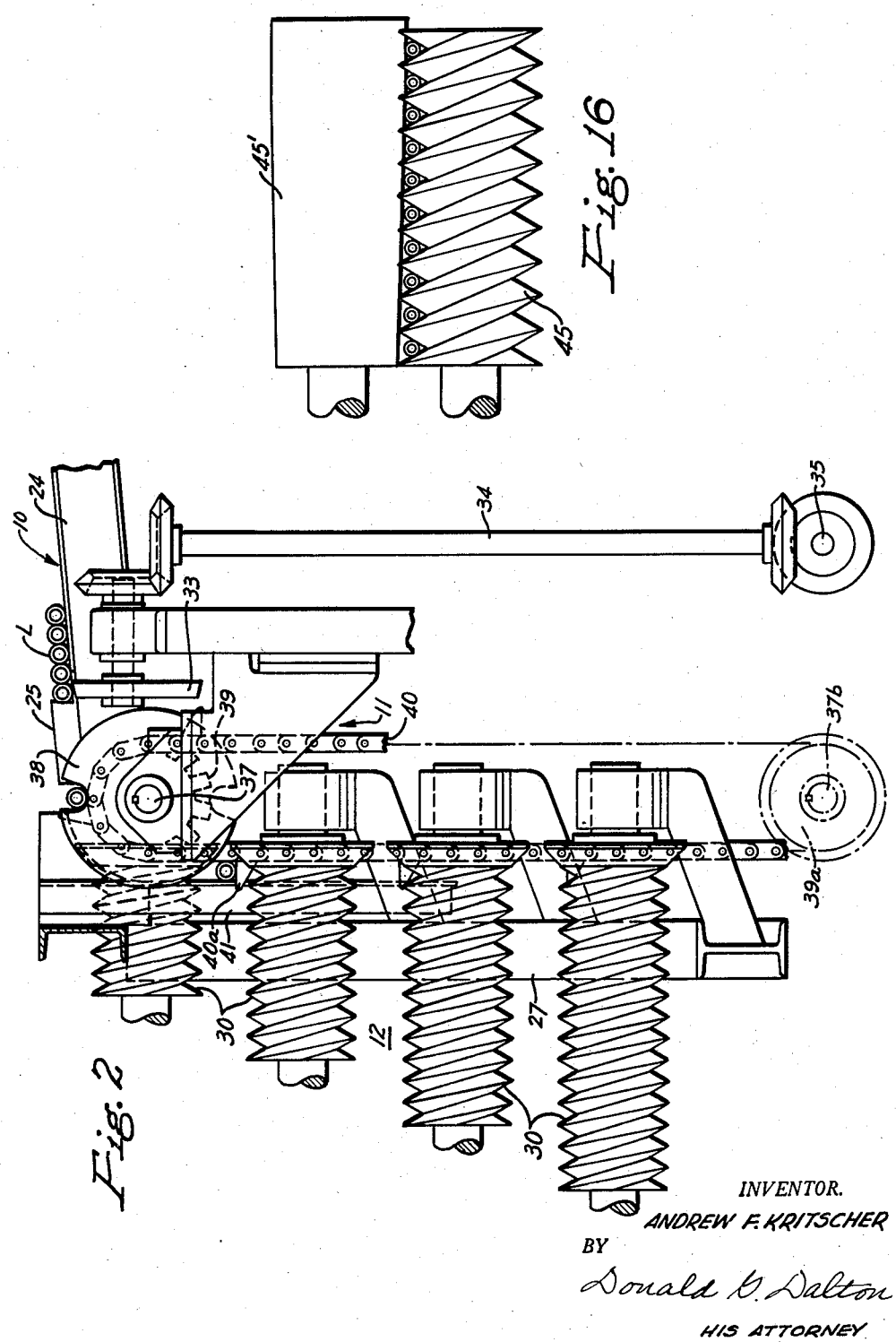

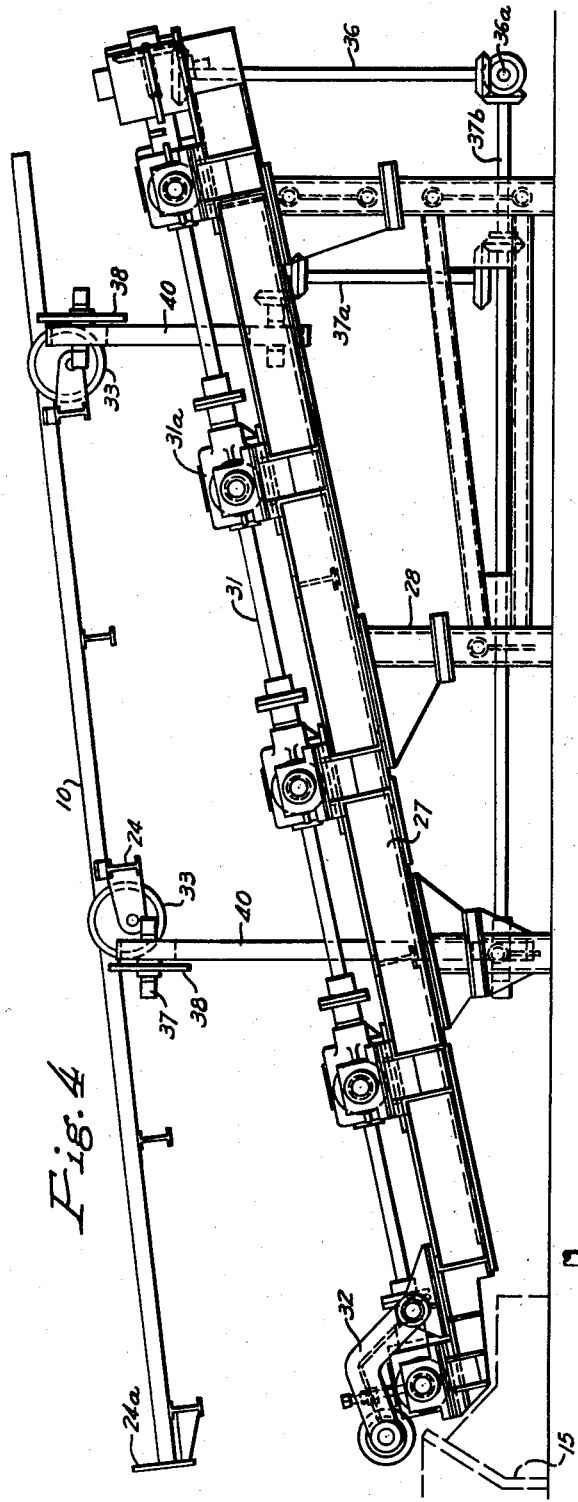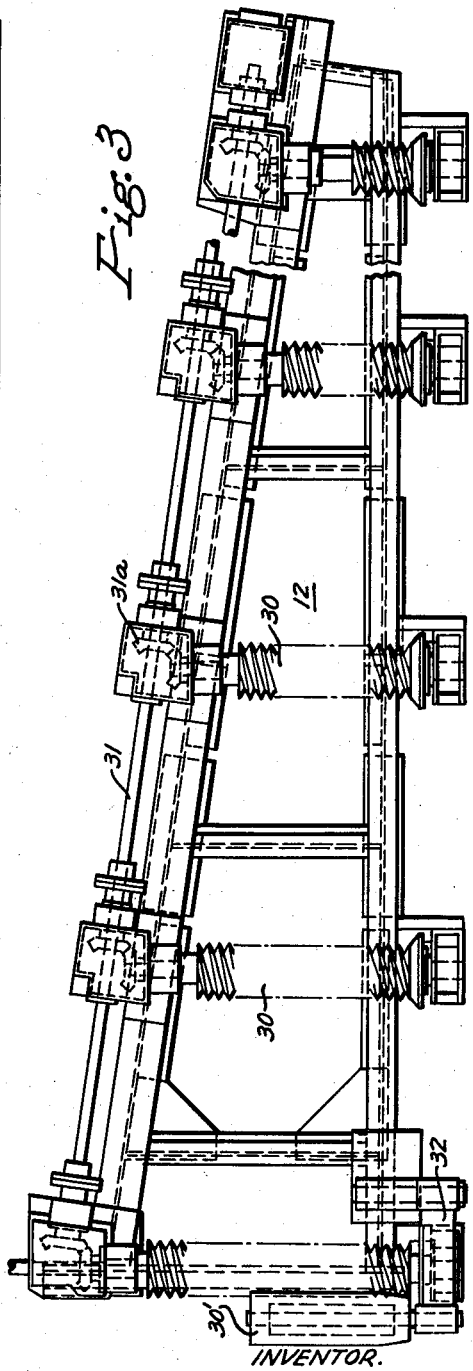

July 22, 1958
A. F. KRITSCHER
2,844,122
APPARATUS FOR GALVANIZING PIPE
Filed March 8, 1956
11 Sheets-Sheet 8
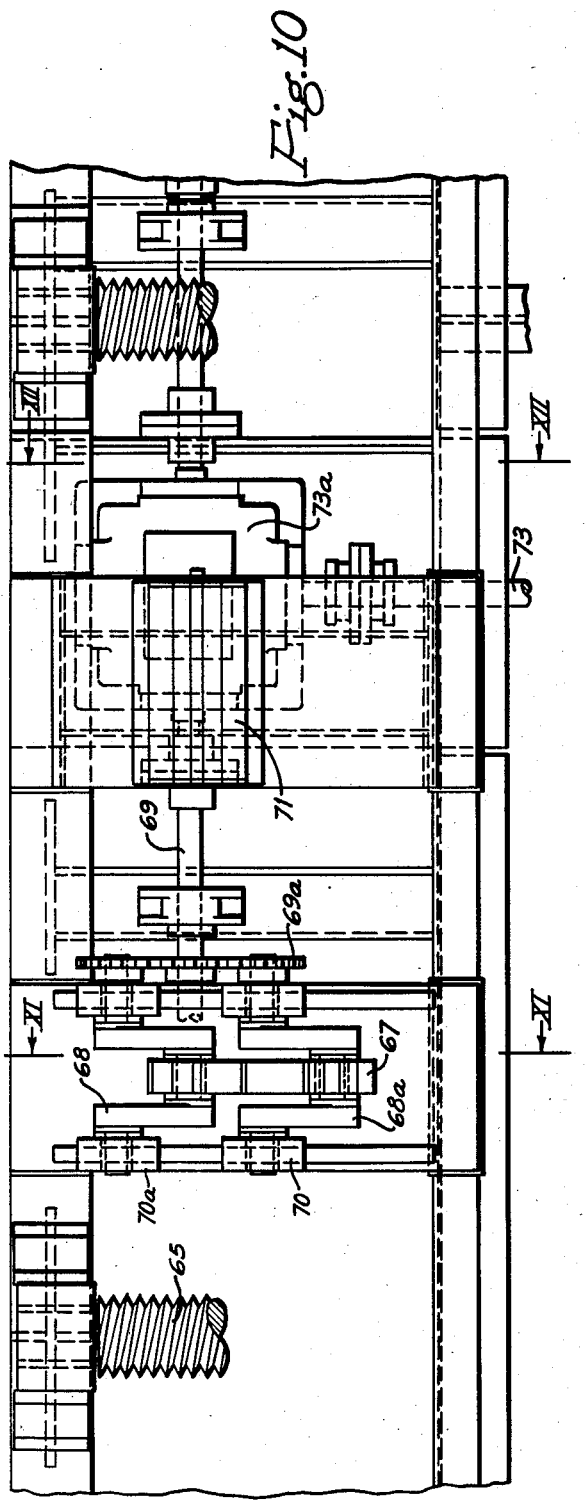
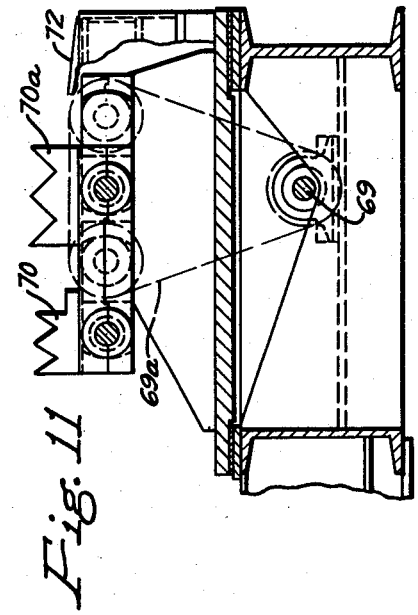
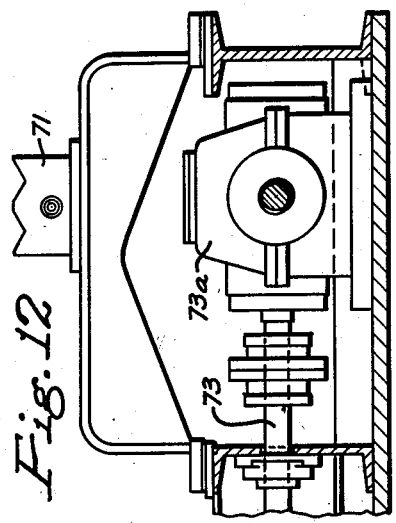
INVENTOR.
ANDREW F. KRITSCHER
BY
Donald G. Dalton
HIS ATTORNEY July 22, 1958     A. F. KRITSCHER     2,844,122
APPARATUS FOR GALVANIZING PIPE
Filed March 8, 1956     11 Sheets-Sheet 9
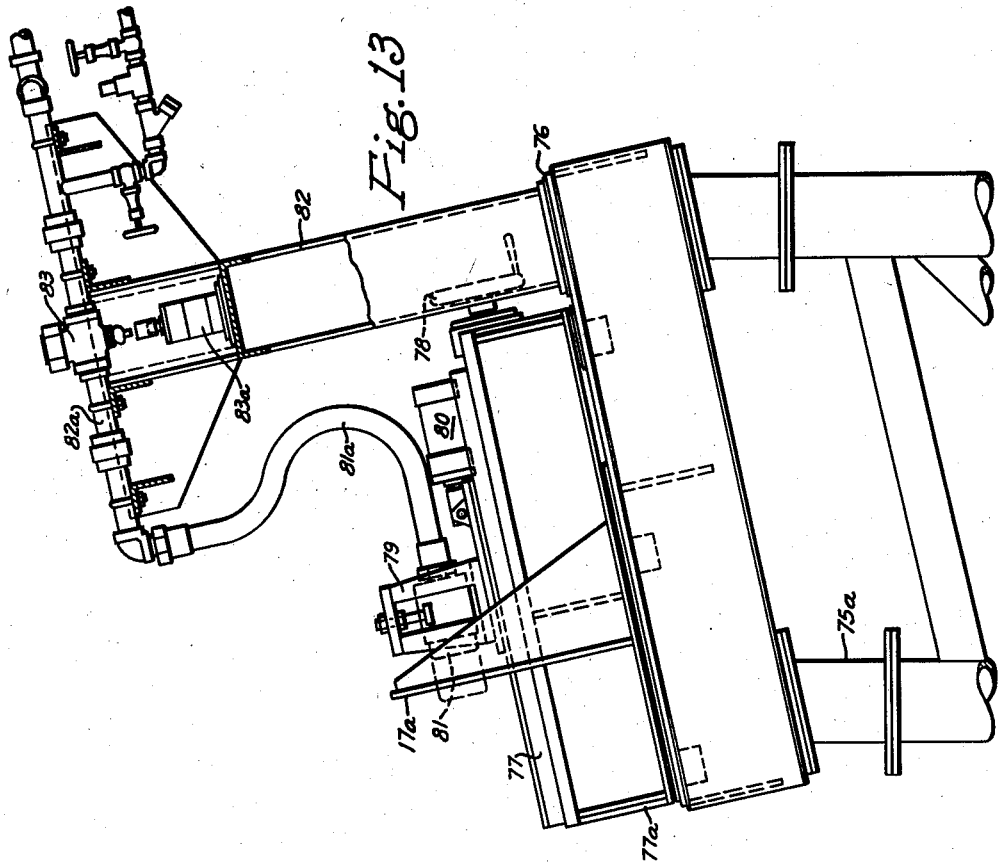
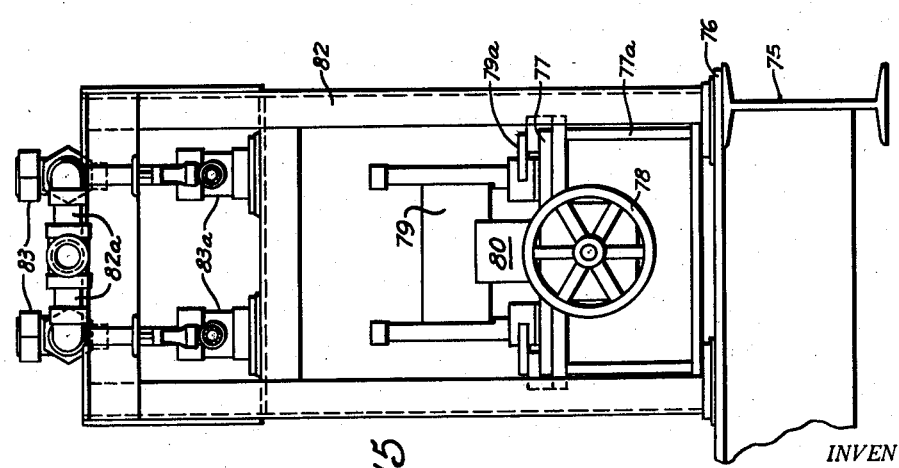
INVENTOR.
ANDREW F. KRITSCHER
BY
Donald G. Dalton
HIS ATTORNEY July 22, 1958  A. F. KRITSCHER  2,844,122
APPARATUS FOR GALVANIZING PIPE
Filed March 8, 1956  11 Sheets-Sheet 10
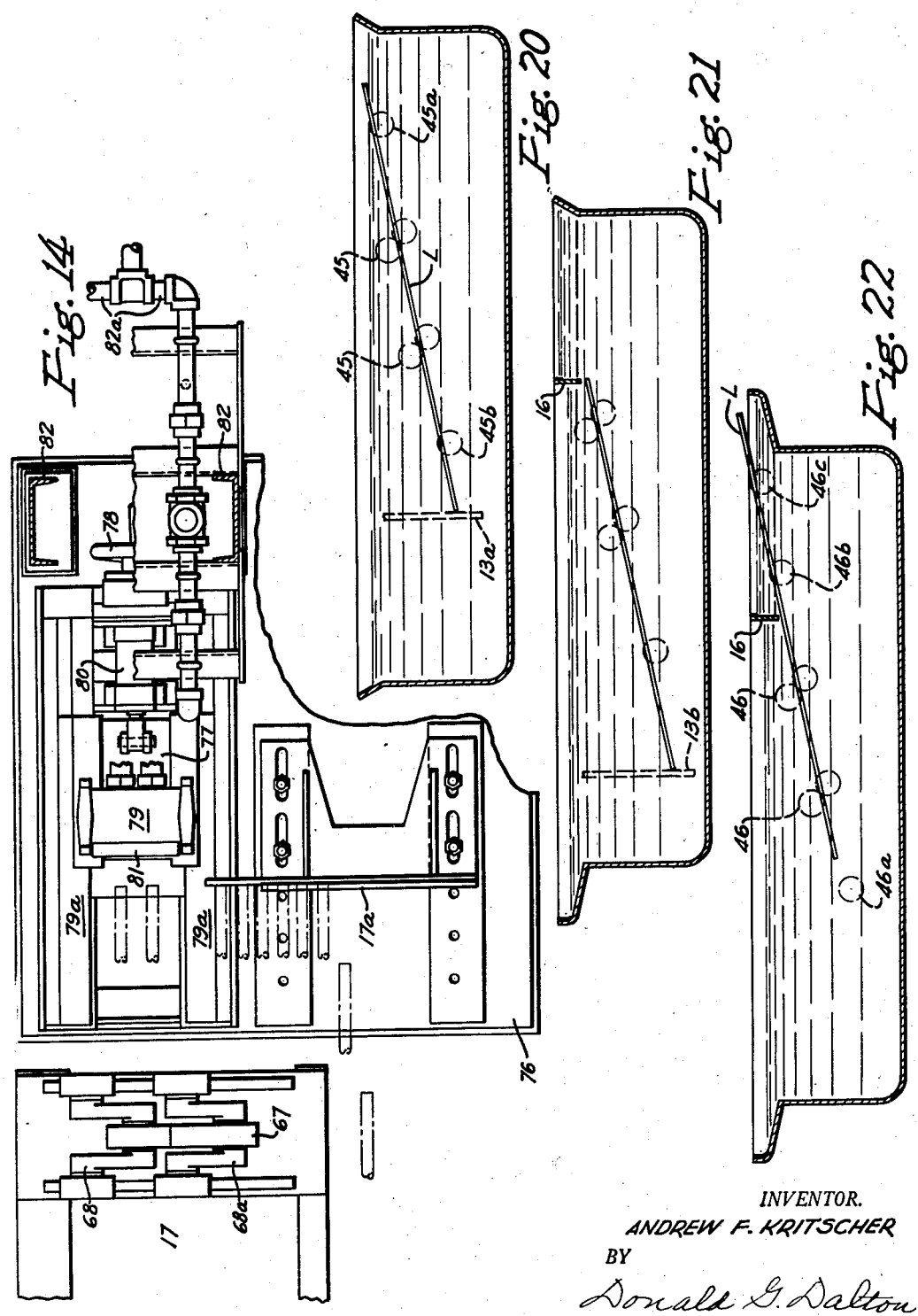
INVENTOR.
ANDREW F. KRITSCHER
BY
Donald G. Dalton
HIS ATTORNEY July 22, 1958 — A. F. KRITSCHER — 2,844,122
APPARATUS FOR GALVANIZING PIPE
Filed March 8, 1956 — 11 Sheets—Sheet 11

INVENTOR.
ANDREW F. KRITSCHER
BY Donald G. Dalton
HIS ATTORNEY

United States Patent Office 2,844,122
Patented July 22, 1958

2,844,122

APPARATUS FOR GALVANIZING PIPE

Andrew F. Kritscher, Mount Lebanon Township, Allegheny County, Pa., assignor to United States Steel Corporation, a corporation of New Jersey Application March 8, 1956, Serial No. 570,235

11 Claims. (Cl. 118—423)

This invention relates to the coating of pipe with zinc by immersion in molten spelter and, in particular, to apparatus capable of making a product of good quality at high speed and low cost.

It has been the practice heretofore, in the continuous galvanizing of pipe, to introduce successive lengths of pipe endwise into the spelter bath, with the leading end lower than the trailing end, then to lower the trailing end below the surface of the bath and raise the leading end, after which the pipe lengths are removed by endwise movement in the same direction as that in which they were introduced ("The Making, Shaping and Treating of Steel," 6th ed., p. 1193). Apparently, as the leading end enters the bath, the spelter flowing up into the pipe is chilled by contact therewith and freezes, forming a zinc plug a short distance inwardly from the leading end which, for the moment, prevents the further rise of spelter up through the interior of the pipe. In the meantime, contaminants such as dross and ash floating on the bath enter the trailing end as it is lowered into the bath. Eventually, as the pipe is heated by the bath, the plug adjacent the leading end is melted. By this time a substantial hydrostatic head may exist, tending to force spelter up through the pipe toward the trailing end thereof, but there is no assurance that dross and ash accumulated in the pipe will be flushed out as the pipe length is purged by spelter rising through it. In fact, ash which has already come in contact with the pipe will adhere tightly despite the purging effected by the rising spelter. As a result, the interior of the pipe may not be completely coated with zinc and may have dross adhering thereto which is objectionable.

I have invented a novel apparatus for coating pipe which overcomes the aforementioned objection to the conventional practice. In accordance with the invention, I introduce a length of pipe in the normal way into a preheating bath which may be molten lead or zinc, but I do not immerse the trailing end until the pipe has become heated sufficiently to melt the plug formed therein adjacent the entry end by chilling, thus permitting the pipe to fill with clean molten metal. This precludes the initial entry of dross and ash into the trailing end. I then completely immerse the pipe length, introduce the trailing end into a coating bath from below and withdraw it through the coating bath. Preferably, the preheating bath is lead and the coating bath of zinc spelter floats thereon, being confined by a dam to a limited portion of the surface of the lead bath. This permits the end of the pipe length which trails as the length enters the lead bath, to be moved laterally under the spelter and brought out through the latter. This practically prevents any dross from being deposited on the interior of the pipe and insures complete coating and freedom from bare patches caused by the presence of ash.

My invention also contemplates a novel form of apparatus for carrying out the method outlined above. The details of the apparatus will be more fully described herebelow and particularly defined in the appended claims. In general terms, it includes a feed-in table, means for delivering pipe lengths singly therefrom and lowering them onto an entry conveyor sloping downwardly toward the preheating bath. Conveyors extending down into the bath along an inclined plane, cause progressive immersion of the lengths. A pusher affords positive driving force endwise of the lengths. Spaced stop plates arrest the entering lengths successively while the conveyors are effective to shift the lengths laterally and then withdraw them from the bath through the molten spelter. An exit or discharge conveyor provided with an air-blast pipe receives the emerging lengths and a transfer mechanism places them on a magnetic holding table where they are subject to a blast of steam for removing excess zinc from the interior. The pipe lengths are then ready for shipment, after such finishing treatment or operations as may be desired.

A complete understanding of the invention may be obtained from the following detailed description and explanation which refer to the accompanying drawings illustrating the present preferred embodiment. In the drawings:

Figure 1 is a plan view, largely diagrammatic, of my improved apparatus;

Figure 2 is a view in elevation such as would be projected on the plane of line II—II of Figure 1 with parts in section;

Figure 3 is a plan view of the entry conveyor;

Figure 4 is a partial elevation thereof;

Figure 9 is an elevation thereof;

Figure 10 is a partial plan view of the transfer mechanism;

Figures 11 and 12 are sections therethrough taken along the planes of lines XI—XI and XII—XII of Figure 10;

Figure 13 is a side elevation, partly in section, of the adjustable blow-through apparatus;

Figure 14 is a plan view thereof;

Figure 15 is an end elevation thereof;

Figure 16 is a partial elevation showing a modification of a conveyor detail;

Figures 20, 21 and 22 are diagrammatic views showing the several stages of the coating process.

Figure 5:
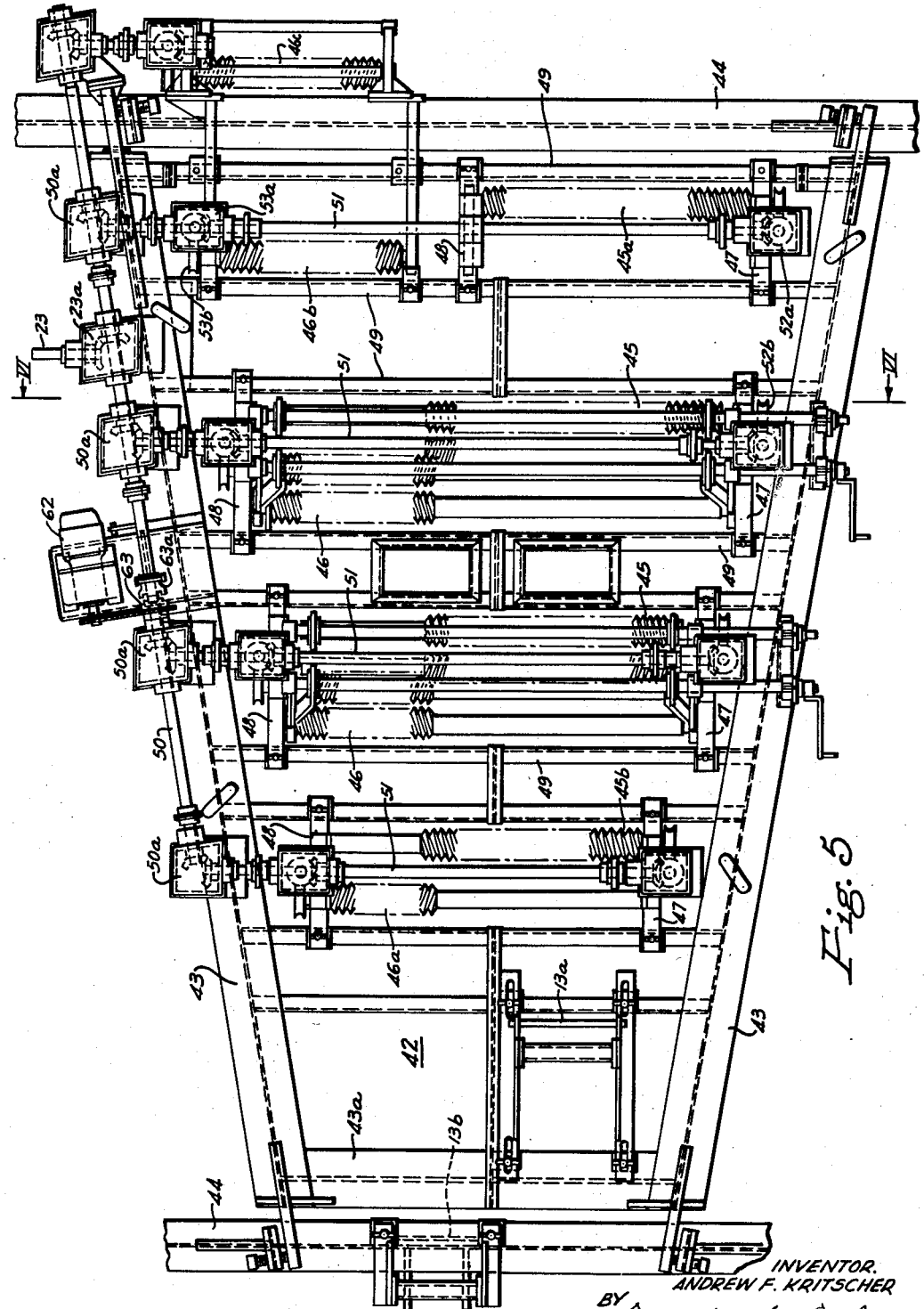
Figure 5 is a plan view of the bath conveyors or "rig"

Referring now in detail to the drawings and, for the present, particularly to Figure 1, the apparatus of my invention comprises several principal parts, viz., a feed-in table 10 with discharge and lowering means 11, an entry conveyor 12, bath conveyors 13 and 14 located in a tank 15 having a dam 16 enclosing one corner thereof, an exit conveyor 17, transfer mechanism 18 and steam-jet blow-through 19. Stop plates 13a and 13b cooperate with conveyor 13 and a stop plate 17a with conveyor 17. The several conveyors are driven by a motor 20 through reduction gearing 21, chain-and-sprocket drives 22, 22' and shafts 23, 23' including universal joints. Details of the drives for the several conveyors are shown partly in Figure 1 but are shown completely in other figures of the drawings and will be described later.

Referring more particularly to Figures 2 through 4, the feed-in table 10 includes spaced skids 24 sloping downwardly in the direction along the skids toward stop blocks 25. The upper edges of skids 24 are disposed in a plane which slopes transversely thereof at a slight angle (about 7°) to the horizontal, so that pipe lengths L disposed thereon will drain free of the flux solution in which they are dipped just before coating. A stop rail 24a (see Figure 1) at the lower side of the table carried by the adjacent skid, limits downward movement of the lengths across the width of the table.

Entry conveyor 12 comprises a triangular frame 27 of structural members supported on posts 28, sloping downwardly toward tank 15 which contains a bath of molten lead. Helically grooved conveyor rollers 30 are journaled horizontally in frame 27 and are driven by a line shaft 31 through bevel gearing 31a. A hold-down roller 30' is journaled above the lowermost roller 30, on an arm 32 pivoted to frame 27. The grooves in rollers 30 effect sidewise movement of the pipe lengths simultaneously with travel longitudinally of the conveyor.

The discharge and lowering means 11 serves to transfer pipe lengths individually from table 10 to conveyor 12. It includes two eccentric feeding discs 33 journaled on skids 24, effective on rotation to push pipe lengths L successively above stop blocks 25. Discs 33 are driven through bevel gears and shafts 34 by a shaft 35 which is driven by shaft 31 through a shaft 36 and a shaft 36a. Stub shafts 37 are journaled in bearings carried on suitable supports at the entering side of conveyor 12. Each shaft has a notched transfer disc 38 and a head sprocket 39 thereon. Pipe lengths rolling down the upper faces of blocks 25 are caught in the notches of discs 38, the rotation of the latter being properly timed relative to rotation of feeding discs 33.

Chains 40 are trained over the head sprockets and foot sprockets 39a mounted on shafts 37a and 37b. Shaft 37a is driven from shaft 37b which is driven by shaft 36a through bevel gears. The chains have pipe-carrying dogs 40a spaced therealong and located so that corresponding dogs on the two chains will hold a pipe length received from discs 38 on rotation thereof. As the dogs descend on the left-hand reach of the chains as viewed in Figure 2, the pipe lengths are held thereon by vertical guide rails 41. As will be evident from Figure 4, the inclination of conveyor 12 is greater than that of table 10. Chain 40 nearer the lower end of conveyor 12 will therefore be longer than the chain at the upper end and will travel faster in order that a lug on each chain will reach the plane of rollers 30 at the same instant so as to deposit a pipe length smoothly thereon. The desired differential between the chain speeds is provided by properly choosing the ratios of the driving gears.

Figure 6:
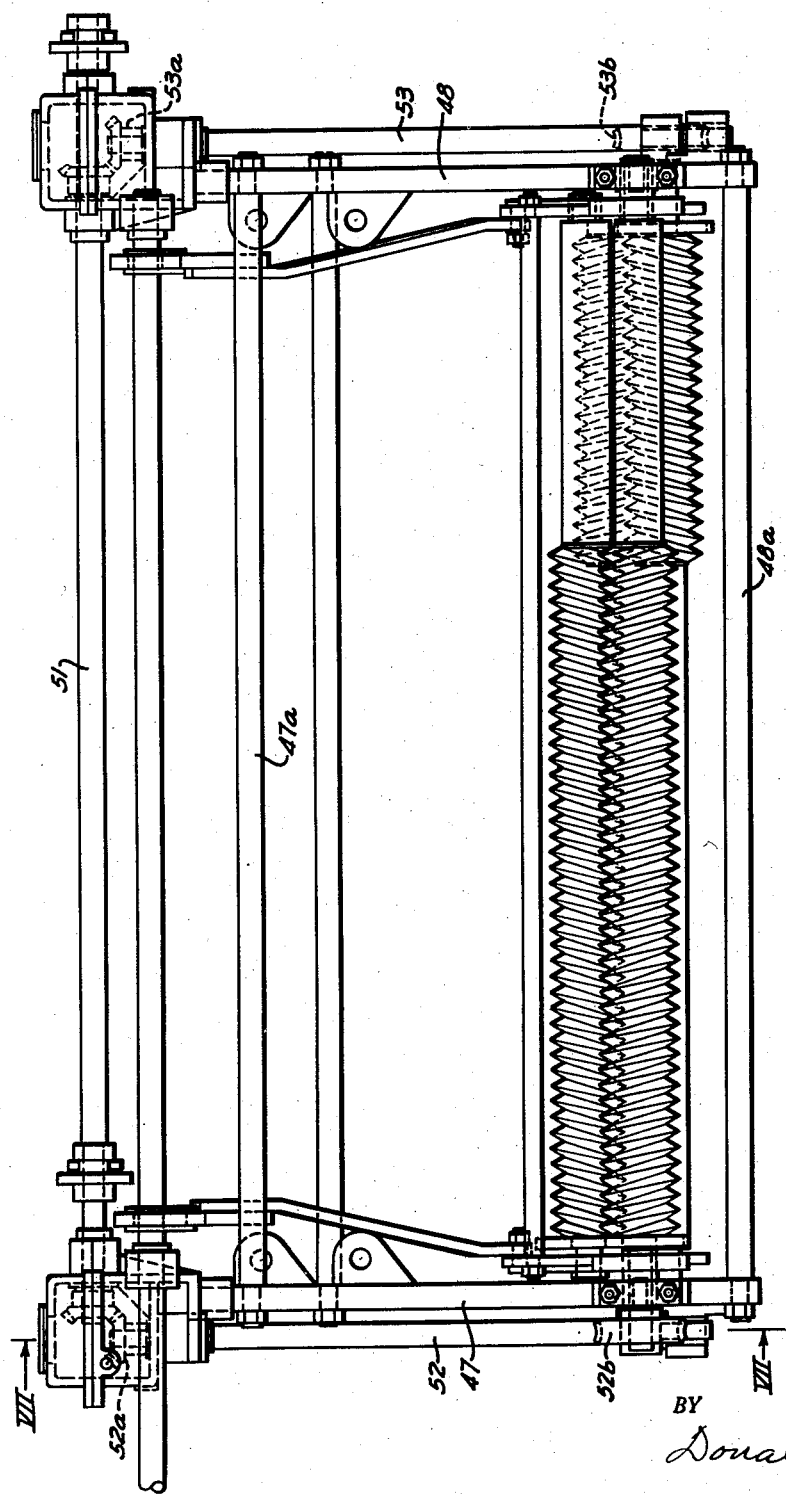
Figure 6 is an elevation of one unit thereof removed from its supporting frame.

Tank 15 is carried in any suitable furnace setting and the lead with which it is filled is maintained molten by any convenient form of heating means. A bath of molten zinc is confined within dam 16 and floats on the lead bath (see Figure 22). A rig 42 shown in Figures 5–7, embodying the conveyors 13 and 14, is disposed in tank 15, the conveyor rollers lying in the inclined plane containing rollers 30. That is to say, conveyor 13 is a continuation of conveyor 12 and conveyor 14 of conveyor 17. The rig comprises an A-frame made up of horizontal side rails 43 and an end rail 43a suspended from cross beams 44 spanning tank 15. Two pairs of helically grooved rollers 45 and two single rollers 45a and 45b make up the conveyor 13. Similar paired rollers 46 and single rollers 46a, 46b and 46c comprise conveyor 14. The shaft ends of the rollers of each pair are journaled in a cage formed by spaced side frames 47 and 48 of increasing depth suspended between intermediate cross bars 49 extending between side rails 43. The side frames are connected by tie rods 47a and 48a (see Figures 6 and 7). The upper rollers of pairs 45 and 46 hold the pipe lengths down against their tendency to float.

The rollers of conveyors 13 and 14 are driven from a line shaft 50 through bevel gearing 50a. Shaft 50 is driven by shaft 23 through gearing 23a. Cross shafts 51 driven by shaft 50 drive vertical shafts 52 and 53 (see Figures 6 and 7) through bevel gearing 52a and 53a. Shafts 52 and 53 have worms at their lower ends driving worm wheels 52b and 53b, respectively, keyed to the lower roller of each of the pairs 45 and 46. The rollers of each pair are geared together by gears 54 and 55. Rollers 46, 46a, 46b and 46c turn in the direction opposite that in which rollers 45, 45a and 45b are driven. The inner ends of rollers 45 overlap the inner ends of rollers 46 to insure easy transfer of lengths from conveyor 13 to conveyor 14.

Figure 7:
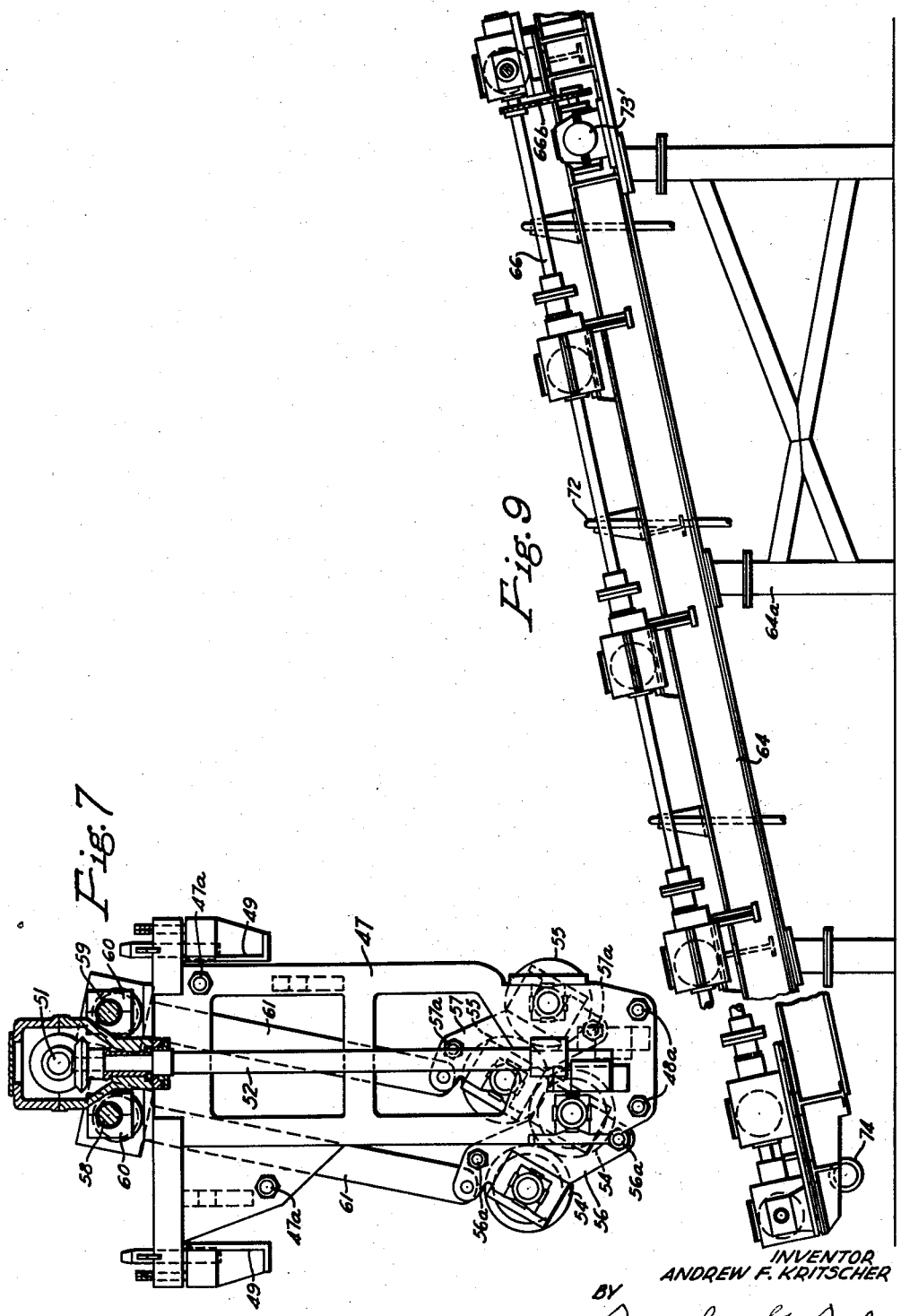
Figure 7 is a section taken along the plane of line VII—VII of Figure 6, with parts in elevation.

The upper roller of each pair 45, 46 is journaled in bearing brackets 56 and 57 which are rotatable on the shaft extensions of the lower rollers. The brackets of each pair are connected by tie rods 56a and 57a. As shown in Figure 7, the plane containing the axes of both rollers of each pair is inclined. Thus by angular adjustment of the bearing brackets, the clear space between the grooves may be varied to suit different sizes of pipe. For making this adjustment, crank shafts 58 and 59 journaled on side frames 47 and 48 have eccentrics 60 connected by links 61 to the brackets 56 and 57. Stop plate 13a is suspended from the rig in the path of pipe lengths advancing over conveyor 13. The second stop plate 13b is similarly mounted and is positioned to be engaged by the pipe lengths after they have been moved laterally past the inner edge of plate 13a.

The rig embodying the conveyors 13 and 14 is adapted to be set in tank 15 and removed therefrom by an overhead crane. When the rig is removed, it is necessary to drive the rollers temporarily until the lead adhering thereto has solidified. Unless this is done, the rollers will be frozen together at their points of contact, making maintenance work difficult. For this reason, I provide a motor-reducer unit 62 mounted on a shelf carried by side rail 43 adjacent shaft 50. This unit, through a chain and sprocket, drives a clutch jaw 63 slidable and rotatable on the shaft. The sliding jaw is adapted to engage a cooperating jaw 63a fixed on the shaft whereby to turn it when shaft 23 is disconnected, preparatory to removal of the rig.

Figure 8:
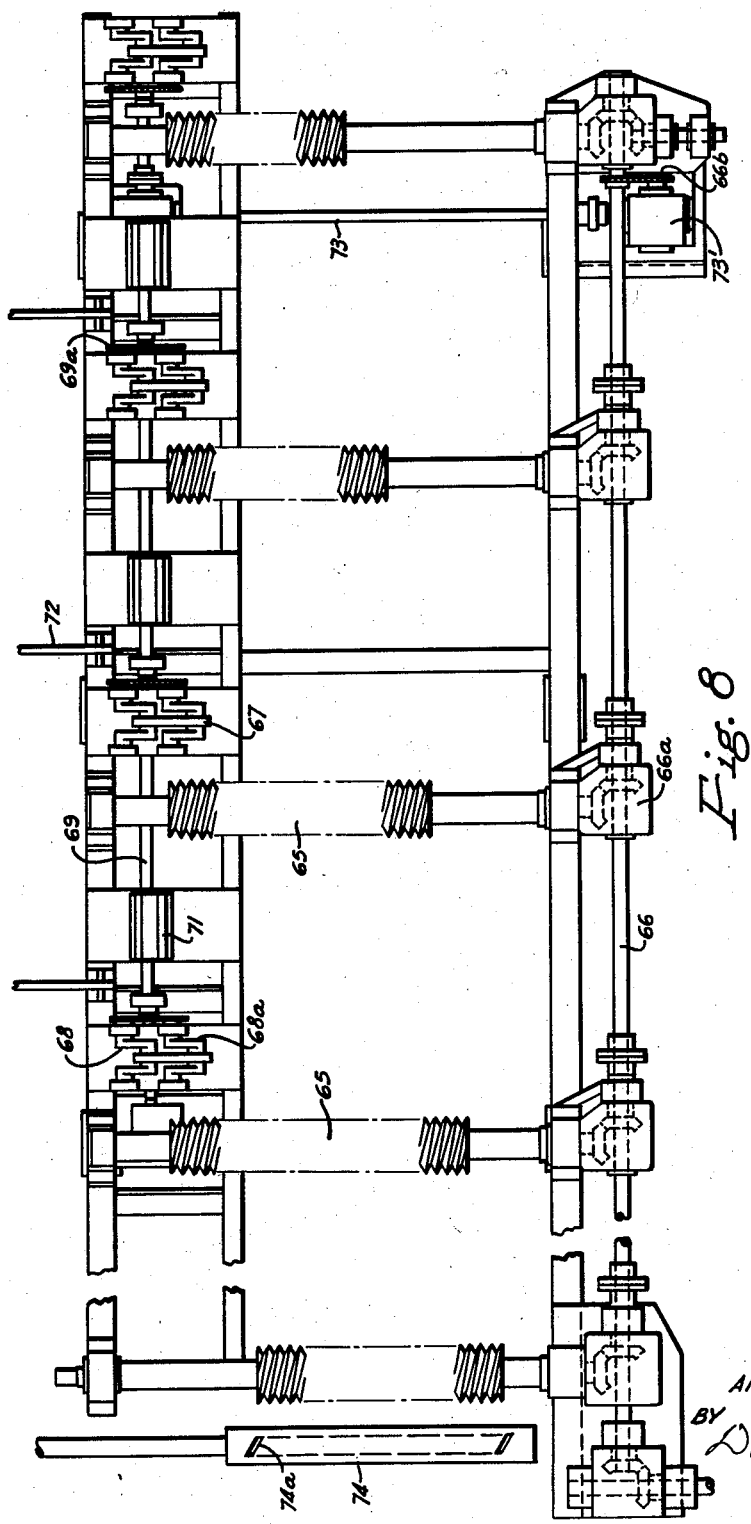
Figure 8 is a plan view of the discharge conveyor.

Exit conveyor 17 shown in Figures 8 and 9 comprises a frame 64 mounted in inclined position on posts 64a. Helically grooved rollers 65 journaled therein are driven by a line shaft 66 through bevel gearing 66a, except that the lowermost roller is driven directly by shaft 23'. As the pipe lengths advance up conveyor 17, any excess zinc adhering to the exterior thereof is removed by air blasts discharged from a pipe 74 having diagonal slots 74a in the upper side thereof. The pipe lengths then strike adjustable stop plate 17a (see Figures 13 and 14) and thereafter are moved laterally toward a plurality of transfer links 67 connecting spaced pairs of continuously operating cranks 68 and 68a. The cranks are driven from a shaft 69 by chains and sprockets 69a. Links 67 have spaced lifter plates 70 and 70a thereon (see Figure 11). Plates 70 lift a pair of pipe lengths from rollers 65 and transfer them to magnetic notched holding blocks 71. On the next passage of the links, plates 70a lift the lengths from blocks 71 and place them on a delivery table 72. Shaft 69 is driven from a shaft 73 through bevel gearing 73a. Shaft 73 is driven by shaft 66 through a chain 66b and bevel gearing 73'.

While the pipe lengths rest on blocks 71, they may be subjected to a steam-jet blow-through by apparatus 19, shown in Figures 13–15. A frame 75 carried on posts 75a supports a base-plate 76. Stop plate 17a is slidably mounted on this base-plate. A secondary base-plate 77 is gibbed to and slidable along a box-like supporting structure 77a by a screw shaft operated by a handwheel 78. A nozzle housing 79 is slidable along ways 79a extending inwardly from the gibs on opposite sides of structure 77a. An air cylinder 80 on plate 77 is adapted to advance housing 79 from retracted position to cause nozzles 81 to approach the ends of pipe lengths on blocks 71. Steam is supplied to the nozzles through hose connections 81a depending from a bent 82 upstanding on plate 76. Pipe branches 82a on the bent have valves 83 operated by air cylinders 83a, under manual or automatic control.

Figure 16 shows a slight modification of the paired rollers 45 of conveyor 13. In this modification, the upper roller 45' is not helically grooved but is plain and tapers in diameter toward its outer end. This affords ample clearance for easy "stabbing" of successive pipe lengths, with increased pressure after entry and slight lateral movement of the pipe length, to insure positive drive during movement from the position of Figure 20 to that of Figure 21.

Figure 17:
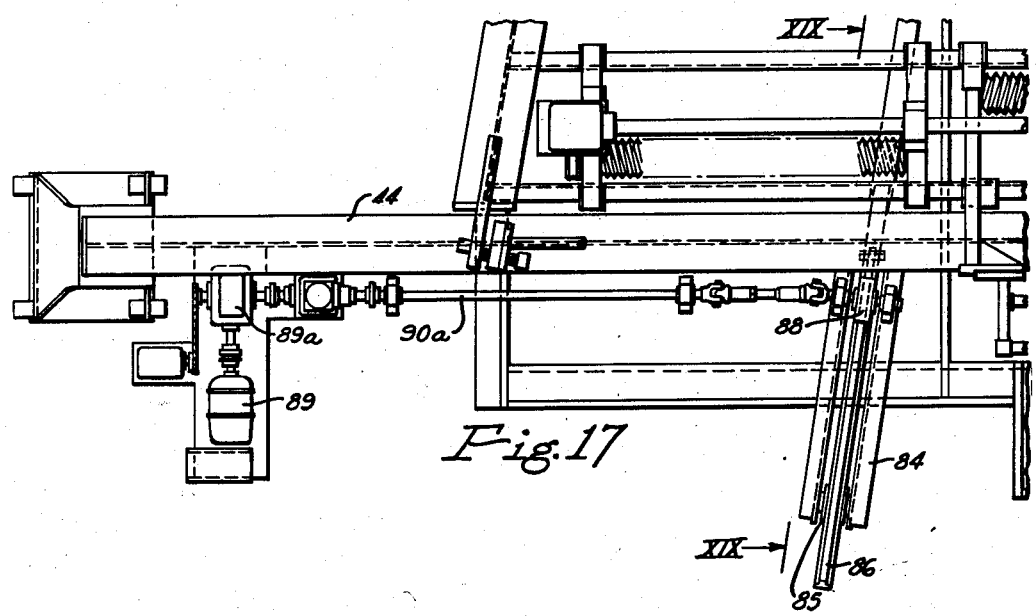
Figure 17 is a plan view of a pusher adapted to cooperate with the entry conveyor.
Figure 18:
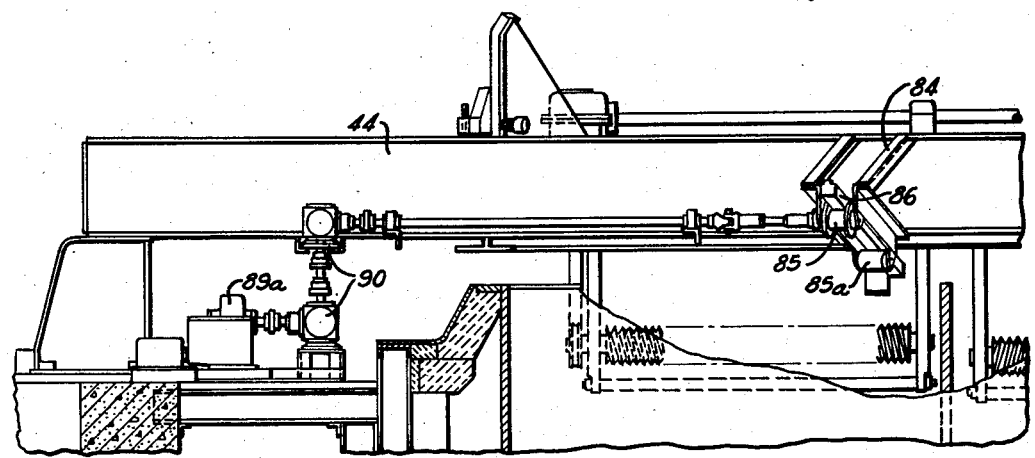
Figure 18 is an end elevation thereof showing the tank setting in section.
Figure 19:
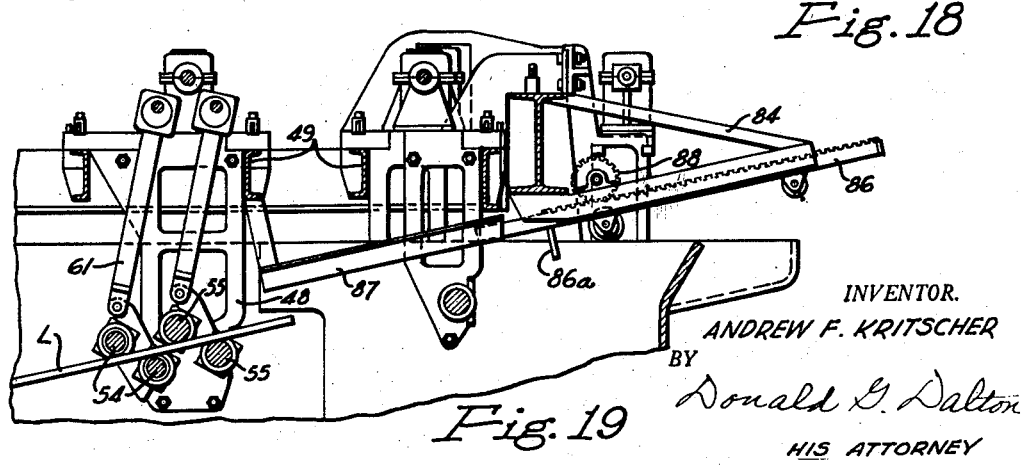
Figure 19 is a section taken along the plane of line XIX—XIX of Figure 17.

In operation of the apparatus described above, it may be found that the pipe lengths, as they are fed down into the bath by rollers 45, will tend to float because of the volume of the metal displaced, thereby causing skidding of the rollers on the lengths with loss of positive feed. To overcome this condition, it may be desirable to make use of reciprocating pusher mounted above conveyor 13, as clearly shown in Figures 17–19. The pusher comprises spaced A-frames 84 extending toward conveyor 12 from the adjacent beam 44, at an oblique angle thereto, parallel to the path of the lengths as they pass from conveyor 12 to conveyor 13. Flanged and plain rollers 85 and 85a are journaled on frames 84 and support a rack bar 86 for reciprocation therebetween. Ahead of beam 44, a guide 87 carried on rails 49 confines the forward end of the rack bar. A finger 86a depending from the bar adjacent its forward end, is adapted to engage successively the trailing ends of lengths moving down conveyor 13 into the bath in tank 15.

A pinion 88 journaled in frames 84 above bar 86 meshes with the teeth of the latter for reciprocating it toward and from conveyor 13. Pinion 88 is driven by a motor 89 through reduction gearing 89a, bevel gears 90 and a shaft 90a including universal joints. Motor 89, of course, is operated in forward and reverse directions under suitable control, so that reciprocation of bar 86 will be properly synchronized with the travel of lengths L. In this way, each length will be engaged by finger 86a and given a forward thrust as its trailing end approaches roller 45a of conveyor 13. The bar is then immediately retracted to clear the way for the next length, and held in that position until the succeeding length has reached a point such that it can be given a push by the advance of finger 86a.

The method of coating pipe effected by the apparatus described above will now be explained by reference to Figures 20–22. Pipe lengths L are fed singly and in rapid succession from table 10 to conveyor 12 by lowering means 11 and are moved axially along the conveyor and laterally thereof at the same time, by rotation of rollers 30 and by virtue of the helical grooves in their surfaces. As the lengths leave conveyor 12 they engage the roller 45a, enter between the pairs of rollers 45, and then engage roller 45b after which the leading end engages stop plate 13a. This stop is so located, according to the axial dimension of the lengths, that when the leading end strikes it, the trailing end remains slightly above the surface as shown in Figure 20. A plug of lead apparently forms near the leading end because of the chilling effect of the length introduced at atmospheric temperatures.

After striking stop plate 13a, the lengths continue to be moved laterally by the helical grooves in the rollers. During this movement, the pipe lengths are heated to bath temperature and the plug formed in the leading end of each is melted, permitting the rise of lead through the interior of the length, usually with considerable force which is apparent at the exposed end. After limited lateral movement, the leading end of each length passes beyond the inner vertical edge of plate 13a and thereupon resumes axial movement on conveyor 13 until the leading end strikes plate 13b. This brings the trailing end well below the surface of the lead bath, as shown in Figure 21, and below the lower edge of dam 16 (Figure 22).

By continued lateral movement of the pipe length on the rollers of conveyor 13, it is immediately transferred to the rollers of conveyor 14 having grooves of opposite hand and turning in the opposite direction. This brings the trailing end within the dam 16. On engagement by rollers 46, the pipe length is reversed and withdrawn from the lead bath, through the zinc bath within dam 16, as shown in Figure 22, the end which was originally trailing now leading. As the length emerges from the zinc bath, excess coating metal is blown off the exterior by air jets from pipe 74. The length then advances up conveyor 17 until its leading end strikes plate 17a. Thereafter, the lengths are moved laterally to the discharge side of conveyor 17, and a pair of them is picked up by lifter plates 70 and transferred to blocks 71. Thereupon, housing 79 is advanced by cylinder 80 to bring nozzles 81 close to the ends of the lengths and valves 83 are operated to discharge blasts of steam therethrough. The lengths are then transferred by lifter plates 70a to delivery table 72.

As will be evident from the foregoing, the invention provides apparatus capable of galvanizing pipe rapidly and efficiently. It has, for example, handled regularly a throughput per minute of from 25 to 30 twenty-one foot lengths of ¾" to 1½" pipe, yielding 96% prime product. This is at the rate of 200 tons per turn, nearly three times the production obtainable with conventional equipment. Since the lengths of pipe are thoroughly preheated by the lead bath, any plug of metal formed in the interior thereof on initial entry into the bath, is fully melted before entry of the length into the zinc bath. Since the trailing ends of the pipe lengths remain above the surface of the lead bath until after such melting of the plug, the deposit of ash or surface contaminants from the surface of bath on the interior of the lengths is avoided. The pick-up of dross on the pipe is prevented by introducing the pipe lengths into the zinc bath from below, while full of clean molten lead. The preheating of the lengths in the lead bath also reduces the thickness of the layer of zinc-iron alloy between the surface of the pipe and the exterior coating layer of zinc. This provides better adherence of the coating and increased corrosion resistance. The invention also makes it possible to obtain a very high zinc efficiency, i. e., the ratio of zinc actually deposited to the total zinc consumption. This ratio, on a percentage basis, was about 96% or higher.

Although I have disclosed herein the preferred embodiment of my invention, I intend to cover as well any change or modification therein which may be made without departing from the spirit and scope of the inventon.

I claim:

1. In a pipe-galvanizing apparatus including a tank having inclined entry and exit conveyors side by side at one end thereof, the combination therewith of a tank conveyor comprising a frame overlying said tank, a plurality of feed-in rollers suspended from said frame and journaled at depths therebelow increasing with the distance from said end, a plurality of feed-out rollers suspended from said frame and journaled at depths therebelow increasing with the distance from said end, the feed-out rollers being substantially parallel and adjacent to the feed-in rollers, all said rollers lying substantially in a common inclined plane, said feed-in rollers having helical grooves adapted to move pipe lengths engaged thereby laterally toward the feed-out rollers, said feed-out rollers also having helical grooves, the grooves of the feed-in and feed-out rollers overlapping, whereby the feed-out rollers are adapted to receive pipe lengths on lateral movement thereof from the feed-in rollers and continue the lateral movement thereof, means driving the feed-in rollers in a direction to move pipe lengths thereon from said end into the tank and means driving the feed-out rollers in the opposite direction to move pipe lengths thereon toward said end.

2. Apparatus according to claim 1, characterized by a first stop plate positioned to be engaged initially by lengths moving downwardly along said feed-in rollers and a second stop plate offset longitudinally and laterally from said first stop plate so as to be engaged by said lengths only after lateral movement on the feed-in rollers sufficient to by-pass said first stop plate.

3. Apparatus according to claim 1, characterized by said feed-in rollers being in cooperating pairs and said feed-out rollers being in cooperating pairs, said pairs of rollers each including an upper and a lower roller and bearing brackets pivoted on the shaft of one roller of each pair, the other roller of each pair being journaled in said brackets.

4. Apparatus according to claim 3, characterized by manually operable links extending upwardly from said brackets for shifting them angularly on said shafts.

5. Apparatus according to claim 1, characterized by a line shaft journaled on said frame and geared to said rollers, a clutch on said shaft, a motor mounted on said frame adapted to drive said shaft through said clutch whereby said shaft may be driven independently of said motor.

6. Apparatus according to claim 1, characterized by a pusher reciprocably mounted above said entry conveyor in alinement with lengths moving downwardly thereon and means operating said pusher to engage the trailing end of successive lengths and forcibly advance the lengths down said one set of rollers.

7. Apparatus according to claim 6, characterized by a frame in which said rollers are journaled, said pusher being mounted on said frame.

8. The combination with an immersion tank for coating metal lengths, of a conveyor sloping downwardly thereinto from one end, said conveyor including a set of rollers on one side feeding lengths longitudinally downwardly into the tank and a set of rollers on the other side feeding lengths upwardly out from said end of the tank, said sets of rollers having helical grooves of opposite hand and being disposed in the same inclined plane so their adjacent ends overlap whereby lengths fed in by the first set of rollers travel laterally as well as longitudinally and are transferred to the second set of rollers for withdrawal from the tank.

9. The combination defined in claim 8, characterized by a stop plate positioned to arrest lengths at a predetermined point in their downward travel on said first set of rollers.

10. The combination defined in claim 9, characterized by a second stop plate positioned to arrest the lengths after lateral travel thereof sufficient to by-pass the first stop plate.

11. The combination defined in claim 8, characterized by a main frame mounted over said tank and spaced side frames depending from said main frame, said rollers being journaled in said side frames.

References Cited in the file of this patent

UNITED STATES PATENTS

| | | |
|---|---|---|
| 711,947 | Dittbener | Oct. 28, 1902 |
| 1,659,848 | Wilson | Feb. 21, 1928 |
| 1,818,475 | Gray | Aug. 11, 1931 |
| 1,837,607 | Biggert | Dec. 22, 1931 |
| 2,313,040 | Alling | Mar. 9, 1943 |
| 2,326,843 | Ely | Aug. 17, 1943 |
| 2,356,739 | Ericsson | Aug. 29, 1944 |
| 2,481,130 | Lindemuth | Sept. 6, 1949 |
| 2,570,906 | Alferieff | Oct. 9, 1951 |
| 2,718,474 | Hodil | Sept. 20, 1955 |